(12) United States Patent
Cody et al.

(10) Patent No.: US 7,773,843 B2
(45) Date of Patent: Aug. 10, 2010

(54) BI-DIRECTIONAL TAP ASSEMBLIES FOR TWO-WAY FIBER TOPOLOGIES

(75) Inventors: Joseph Todd Cody, Hickory, NC (US); Michael Paul Kunigonis, Jr., Hickory, NC (US); Christopher Paul Lewallen, Hudson, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/267,179

(22) Filed: Dec. 26, 2008

(65) Prior Publication Data
US 2010/0166370 A1 Jul. 1, 2010

(51) Int. Cl.
G02B 6/26 (2006.01)
G02B 6/36 (2006.01)
G02B 6/42 (2006.01)

(52) U.S. Cl. .............. 385/48; 385/25; 385/32; 385/50; 385/76; 385/77

(58) Field of Classification Search .......... 385/25, 385/32, 48, 50, 76, 77
See application file for complete search history.

(56) References Cited

U.S. PATENT DOCUMENTS

2005/0259928 A1* 11/2005 Elkins et al. ............ 385/100
2006/0093278 A1* 5/2006 Elkins et al. ............ 385/76
2006/0120672 A1* 6/2006 Cody et al. ............. 385/86
2006/0147172 A1* 7/2006 Luther et al. ........... 385/135

* cited by examiner

Primary Examiner—Charlie Peng
Assistant Examiner—Jerry Blevins
(74) Attorney, Agent, or Firm—C. Keith Montgomery

(57) ABSTRACT

Bi-directional tap assemblies for two-way fiber topologies are disclosed. The assembly includes a fiber-optic cable having a cable optical fiber adapted to carry bi-directional optical signals and that is preterminated at a mid-span location to form at least one first cable fiber end and at least one second cable fiber end. First and second tether fibers are respectively spliced to the first and second cable fiber ends. In one version of the assembly, the tether fibers are contained in respective first and second tether covers to form first and second tethers that extend in opposite directions from the tap point. In another version of the assembly, the tether fibers are bend-insensitive fibers and are contained in a single tether cover to form a single tether. The tether fibers bend back on themselves within the tether cover and terminate at a common end of the tether, thereby allowing both downstream and upstream optical signals to be accessed at the tether end. The single tether is configured to be translateable along the fiber-optic cable by allowing the bend locations in the bend-insensitive fibers to change as the tether is translated.

18 Claims, 9 Drawing Sheets

BI-DIRECTIONAL TAP ASSEMBLIES FOR TWO-WAY FIBER TOPOLOGIES

CROSS-REFERENCE TO RELATED APPLICATIONS

The present application is related to U.S. patent application Ser. No. 12/266,991, entitled "BI-DIRECTIONAL CABLE ASSEMBLY WITH BEND-IMPROVED FIBER TETHER," filed Nov. 7, 2008, docket number HI08-010.

BACKGROUND

1. Technical Field

The present invention relates generally to fiber-optic cables used in telecommunication systems, and in particular relates to bi-directional tap assemblies arranged at mid-span access locations of two-way fiber topologies.

2. Technical Background

Optical fiber is used for a variety of broadband telecommunication applications that involve voice, video and/or data transmissions. Such fiber-based telecommunication systems utilize fiber-optic cables (e.g., "distribution cables") that include a number of mid-span access locations at which one or more optical fibers are terminated and interconnected with a branch cable or a drop cable. The mid-span access locations provide an interconnection point, also referred to as "access point" or "tap point" (or just "tap" for short) from the distribution cable. The interconnection point can include a tap assembly that connects optical fibers in the distribution cable to another location, such as another network distribution cable or termination point, or directly to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx."

Tap assemblies are common for one-way fiber topologies wherein optical signals travel in a single direction. Such taps are typically formed by accessing an optical fiber in a fiber optical cable and cutting the fiber to form two fiber sections. One of the fiber sections is terminated (e.g., spliced to a connectorized section of optical fiber) to form the tap, while the other section of the fiber becomes "dark fiber" because it is not utilized in the one-way topology. This approach, however, cannot be used for two-way fiber topologies because the fibers carry signals in two directions. This means that one section of the fiber cannot be disregarded in forming the tap.

SUMMARY

In accordance with embodiments broadly described herein, a bi-directional tap assembly includes at least one short length of cable, referred to herein as a "tether." The tether is attached (e.g., spliced or otherwise optically connected) to an optical fiber of a fiber optical cable at a mid-span location. The mid-span location is also referred to as a "tap point." The bi-directionality of the tap assembly means that at least one "upstream" and at least one "downstream" optical fiber is accessed at the tap point, wherein "upstream" and "downstream" are relative terms used to indicate direction in which information travels over the fiber-optic cable from one or more reference locations, such as a central office or other types of communications management centers or telecommunication devices. In a bi-directional fiber system topology, a single optical fiber carries optical signals in both directions.

Bi-directionality is associated with a ring network topology where a fiber-optic cable begins and ends at the same location, e.g., a central office. Bi-directionality also is associated with a non-ring topology where ends of a distribution cable terminate at respective locations that transmit and receive information over the distribution cable. In a bi-directional telecommunications system, at least one optical fiber in the system is configured to carry optical signals in two directions.

The tether of the tap assembly permits at least one connector to be positioned at a desired location in a fiber optic communications network. In an example embodiment, the tether is manufactured in the factory and spliced or otherwise optically connected in the field to a previously installed fiber optic distribution cable. Alternatively, the tap assembly (including a tether and at least one connector) is manufactured in the factory (i.e., factory-prepared) for a pre-engineered fiber optic communications network and wound onto a cable reel for deployment in the field.

While a tether can be of any length, in practice it typically provides a relatively short length of cable (as compared to the distribution cable) to allow a distribution or termination point to be positioned at a desired location. Thus, in various example embodiments, the tether has a length up to about 100 feet, more especially about 25 feet, and preferably a length of about 12 to about 15 feet. The tether eliminates the need for absolute accuracy in the engineering of the fiber optic network, the manufacture of the distribution tap assembly and the deployment of the distribution tap assembly. In example embodiments, the tap assembly includes two tethers: an upstream tether and a downstream tether.

The ends of the one or more optical fibers of the tether ("tether optical fibers") can be connectorized with a tether connector, such as with one of the following connector types: SC, LC, DC, FC, ST, SC/DC, MT, MT-RJ, MTP, MPO. Other like single or multi-fiber connectors now known or hereafter developed can also be used.

Accordingly, a first aspect of the invention is a bi-directional tap assembly that includes a fiber-optic cable having at least one cable optical fiber. The cable optical fiber is adapted to carry bi-directional optical signals and is preterminated at a mid-span location to form a first cable fiber section having a first cable fiber end and a second cable fiber section having a second cable fiber end. The bi-directional tap assembly can include at least one tether formed at both cable fiber sections, from one cable fiber section and one tether fiber, or from tether fibers optically connected to the respective cable fiber sections.

A second aspect of the invention is a method of forming a bi-directional tap in a fiber-optic cable that includes at least one cable optical fiber. The method includes preterminating, at a mid-span location, the at least one cable optical fiber to form corresponding at least one first and at least one second cable fiber sections having respective first and second cable fiber ends. The method also includes optically coupling the at least one first and the at least one second cable fiber sections at their respective first and second cable fiber ends to respective at least one first and at least one second tether fibers. An example embodiment of the method includes performing the above acts of the method prior to deploying the cable.

A third aspect of the invention is the combination of accessed fibers. In a multifiber cable, whether a ribbon fiber cable or a loose tube cable, one particular tap point might access fibers ribers 1-4 from the upstream direction and fibers 5-8 from the downstream direction, leaving fibers 9-12 as express fibers, for example. Downstream, therefore, fibers 1-4 are "dark", but can be accessed in a subsequent tap point from the downstream direction. Conversely, fibers 5-8 can be accessed upstream of the original tap point, creating a tether location and utilizing, from both directions, the full use of fibers 1-8, with direct or indirect communication with the central office by virtue of the "bi-directionality" of the technology. While all combinations of accessing fibers are exhaustive and not specifically covered by this invention, they are within the scope of the technology covered by this invention.

Additional features and advantages will be set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION

Figure 1:
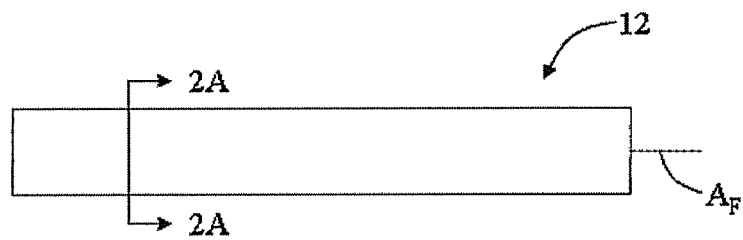
FIG. 1 is a schematic side view of a section of an example embodiment of a bend-insensitive optical fiber in the form of a nanostructure optical fiber.

Reference is now made in detail to the present embodiments of the invention, examples of which are illustrated in the accompanying drawings. Whenever possible, the same reference numbers and symbols are used throughout the drawings to refer to the same or like parts. For example, bend-insensitive fibers and tether fibers use the same reference number 12 for convenience even though the tether fiber need not be a bend-insensitive fiber in all example embodiments. In the drawings and in the description below, a signal traveling from upstream to downstream is referred to as a "downstream signal," and a signal traveling from downstream to upstream is referred to as an "upstream signal."

Various embodiments of bi-directional tap assemblies for two-directional fiber topologies are disclosed. The embodiments shown include a protective cover, such as an overmold, for substantially sealing an exposed portion of the cable created when pre-selected optical fibers are accessed through the cable sheath, are preterminated, and then are spliced to corresponding tether fibers. The term "preterminated" is used herein to refer to an optical fiber that is terminated at a point short of its total installed length. In the various embodiments described herein, the bi-directional tap assembly of the present invention includes a fiber optic distribution cable ("fiber-optic cable") comprising at least a cable sheath having a predetermined number of optical fibers contained within. The predetermined number of optical fibers may be individualized, ribbonized, and/or combinations of each. The distribution cable may further comprise strength members, strength yarns, one or more buffer tubes, and water-sellable tapes or foams, among other known cable components. The distribution cable may have a round or a non-round cross-section. Example fiber-optic cables suitable for use in the present invention include, but are not limited to, Altos™, SST™ and RPX™ cables available from Corning Cable Systems of Hickory, N.C. Although only one mid-span access location may be shown on a fiber-optic cable in some embodiments for the sake of illustration, the fiber-optic cable may include more than one such access location along its length for attaching multiple tethers at multiple access points. Each mid-span access location is used to access and to terminate pre-selected optical fibers within the fiber optic (distribution) cable.

Bend-improved Optical Fibers

Example embodiments make use of "bend-improved" or "bend performance" optical fibers that may have varying degrees of insensitivity to bends. One type of fiber useful in the present embodiments is "bend-insensitive" fiber, such as fiber in the form of so-called "nanostructure" or "holey" optical fibers. There are a number of such fibers on the market today. Nanostructure fibers have one or more regions with periodically or a periodically arranged small holes or voids, which make the fiber extremely bend insensitive.

Bend-insensitive fibers as used in the present invention include, for example, nanostructure fibers of the type available from Corning, Inc., of Corning, N.Y., including, but not limited to, single-mode, multi-mode, bend performance fiber, bend-optimized fiber and bend-insensitive optical fiber. Nanostructure fibers are advantageous in that they allow for the tap assemblies of the present invention to have fibers with relatively small-radius bends while optical attenuation in the fibers remains extremely low. One example of a bend-insensitive optical fiber includes a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm greater than 8.0 µm, and preferably between about 8.0 and 10.0 µm.

One type of nanostructure optical fiber developed by Corning, Inc. has an annular ring of non-periodic airlines (of diameter $\sim 1 \times 10^{-7}$ m) that extend longitudinally along the length of the fiber. The region with the ring of airlines has a reduced apparent or average index of refraction, because air has an index of refraction of approximately 1 compared to the fused silica matrix refractive index of approximately 1.46. The ring of airlines is positioned to create a refractive index profile that enables superior bend performance (optically) and significantly smaller minimum bend radius specifications.

According to one aspect of the invention, the tether fibers used can satisfy the requirements for G657.B, which generally requires an optical fiber to operate satisfactorily at a bend radius of 7.5 mm, or even at a bend radius of 5 mm. In this specification, fibers satisfying G657.B are described as "bend-tolerant" fibers.

Figure 2A:
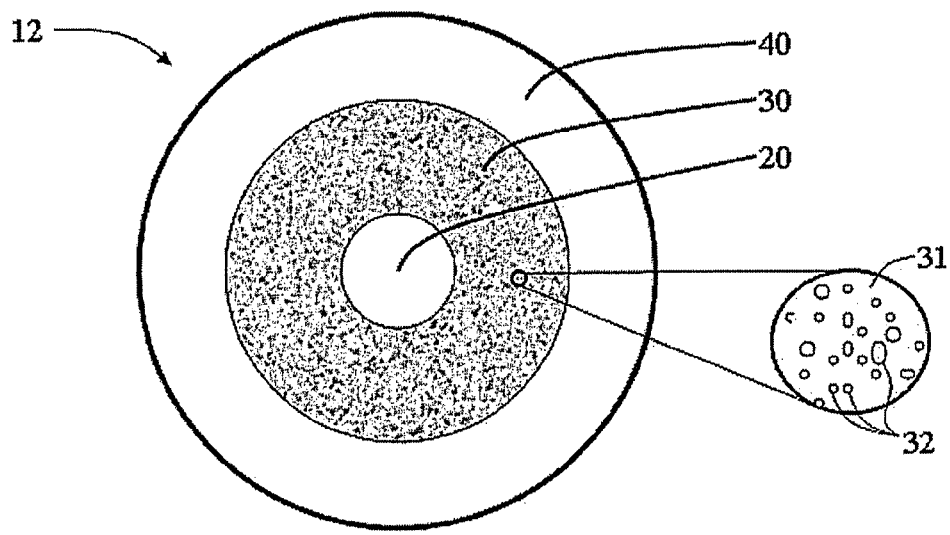
FIG. 2A is a schematic diagram of an example cross-section of the optical fiber of FIG. 1 as viewed along the direction 2A-2A.

FIG. 1 is a schematic side view of a section of an example embodiment of a bend-insensitive fiber in the form of a nanostructure optical fiber ("nanostructure fiber") 12 having a central axis $A_F$. FIG. 2A is a schematic cross-section of nanostructure fiber 12 as viewed along the direction 2A-2A in FIG. 1. Nanostructure fiber 12 can be, for example, any one of the various types of nanostructure optical fibers, such as so-called "holey" fibers. For the purposes of the present invention, a "bend-insensitive fiber" includes nanostructure fibers that make use of periodic or non-periodic nanostructures or holes.

In an example embodiment, nanostructure optical fiber 12 includes a core region ("core") 20, a nanostructure region 30 surrounding the core, and an outer cladding region 40 ("cladding") surrounding the nanostructure region. Other ring-type configurations for nanostructure optical fiber 12 are also known. A protective cover or sheath (not shown) optionally covers outer cladding 40.

In an example embodiment, nanostructure region 30 comprises a glass matrix ("glass") 31 having formed therein non-periodically disposed holes (also called "voids" or "airlines") 32, such as the example voids shown in detail in the magnified inset of FIG. 2A. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be "non-periodic airlines." In an example embodiment, glass 31 is fluorine-doped while in another example embodiment the glass is undoped pure silica. By "non-periodically disposed" or "non-periodic distribution," it is meant that when one takes a cross-section of the optical fiber (such as shown in FIG. 2A), the voids 32 are randomly or non-periodically distributed across a portion of the fiber.

Cross sections similar to FIG. 2A taken at different points along the length of nanostructure optical fiber 12 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes/voids 32 are employed in nanostructure region 30, it is desirable in one example embodiment that they be formed such that greater than 95% of and that all of the holes exhibit a mean hole size in the cladding for the optical fiber which is less than 1550 nm, especially less than 775 nm, and preferably less than about 390 nm. Likewise, the maximum diameter of the holes in the fiber is less than 7000 nm, especially less than 2000 nm, and preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. The fibers disclosed in this specification may exhibit combinations of these characteristics.

According to one embodiment, an optical fiber exhibits fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× to about 4000× and image analysis software, such as ImagePro, which is available from Media Cybernetics, Inc. of Silver Spring, Md., USA.

In an example embodiment, holes/voids 32 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes can be periodically or non-periodically disposed. In some embodiments, the plurality of holes comprises a plurality of non-periodically disposed holes and a plurality of periodically disposed holes. Alternatively, or in addition, as mentioned above the depressed index can also be provided by downdoping the glass in the hole-containing region (such as with fluorine) or updoping one or both of the surrounding regions.

Nanostructure region 30 can be made by methods that utilize preform consolidation conditions, which are effective at trapping significant amounts of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose end points are disposed on the silica internal surface defining the hole when the optical fiber is viewed in a perpendicular cross-section transverse to the optical fiber central axis $A_F$.

SEM analysis of the end face of an example nanostructure optical fiber 12 showed an approximately 4.5-micron radius $GeO_2$—$SiO_2$ void-free core (having an index of approximately +0.34 percent delta versus silica) surrounded by an 11-micron outer radius void-free near clad region surrounded by 14.3-micron outer radius non-periodic void-containing cladding region (ring thickness of approximately 3.3 μm), which is surrounded by a void-free pure silica outer cladding having an outer diameter of about 125 μm (all radial dimensions measured from the center of the optical fiber).

The nanostructure region 30 comprised approximately 2.5 percent regional area percent holes (100% $N_2$ by volume) in that area with an average diameter of 0.28 μm and the smallest diameter holes at 0.17 μm and a maximum diameter of 0.48 μm, resulting in a total of about 130 holes in the fiber cross-section. The total fiber void area percent (area of the holes divided by the total area of the optical fiber cross-section× 100) was about 0.05 percent. Optical properties for this fiber were 0.36 and 0.20 dB/Km at 1310 and 1550 nm, respectively, and a 22-meter fiber cable cut-off of about 1250 nm, thereby making the fiber single mode at wavelengths above 1250 nm.

The nanostructure optical fibers used herein may or may not include germania or fluorine to adjust the refractive index of the core and/or cladding of the optical fiber, but these dopants can also be avoided in the intermediate annular region and instead, the holes (in combination with any gas or gases that may be disposed within the holes) can be used to adjust the manner in which light is guided down the fiber core. The nanostructure region 30 may consist of undoped (pure) silica, thereby completely avoiding the use of any dopants in the hole-containing region, to achieve a decreased refractive index, or the nanostructure region may comprise doped silica, e.g. fluorine-doped silica having a plurality of holes. In one set of embodiments, the core includes doped silica to provide a positive refractive index relative to pure silica, e.g. germania doped silica. The core region is preferably hole-free.

Such fiber can be made to exhibit a fiber cut-off of less than 1400 nm, more preferably less than 1310 nm, a 20-mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12-mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and an 8-mm macrobend induced loss at 1550 nm of less than 5 dB/turn, preferably less than 1 dB/turn, more preferably less than 0.5 dB/turn, and even more preferably less than 0.2 dB/turn, and still even more preferably less than 0.1 dB/turn.

The nanostructure fibers used herein may be multimode. Such fibers may comprise, for example, a graded-index core region and a cladding region surrounding and directly adjacent to the core region, the cladding region comprising a depressed-index annular portion comprising a depressed relative refractive index, relative to another portion of the cladding (which preferably is silica which is not doped with an index of refraction altering dopant such as germania or fluorine). Preferably, the refractive index profile of the core has a parabolic shape. The depressed-index annular portion may comprise glass comprising a plurality of holes, fluorine-doped glass, or fluorine-doped glass comprising a plurality of holes. The depressed index region can be adjacent to or spaced apart from the core region.

In an example embodiment, the multimode nanostructure optical fiber exhibits very low bend-induced attenuation, in particular very low macrobending. In some embodiments, high bandwidth is provided by low maximum relative refractive index in the core, and low bend losses are also provided. In some embodiments, the core radius is large (e.g. greater than 20 μm), the core refractive index is low (e.g. less than 1.0%), and the bend losses are low. In an example embodiment, the multimode nanostructure optical fiber exhibits a spectral attenuation of less than 3 dB/km at 850 nm.

In an example embodiment, the numerical aperture (NA) of the nanostructure optical fiber used herein is preferably greater than the NA of the optical source directing signals into the fiber; for example, the NA of the optical fiber is preferably greater than the NA of a VCSEL light source. The bandwidth of the multimode optical fiber varies inversely with the square of $\Delta1_{MAX}$. For example, a multimode optical fiber with $\Delta1_{MAX}$ of 0.5% can yield a bandwidth 16 times greater than an otherwise identical multimode optical fiber except having a core with $\Delta1_{MAX}$ of 2.0%. In some embodiments, the core extends radially outwardly from the centerline to a radius R1, wherein 12.5 μm≦R1≦40 μm. In some embodiments, 25 μm≦R1≦32.5 μm, and in some of these embodiments, R1 is greater than or equal to about 25 μm and less than or equal to about 31.25 μm. The core preferably has a maximum relative refractive index less than or equal to 1.0%. In other embodiments, the core has a maximum relative refractive index less than or equal to 0.5%. Such multimode fibers preferably exhibit a 1-turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

Fiber Bend Angle and Bend Diameter

Figure 2B:
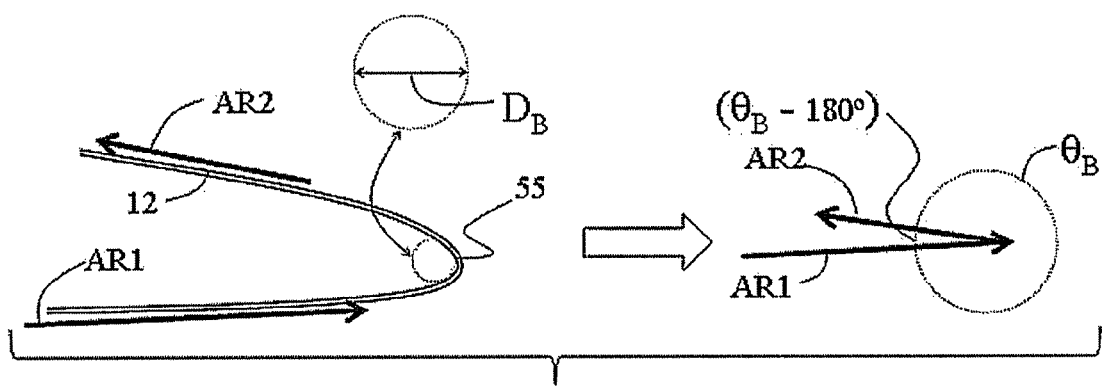
FIG. 2B is a schematic diagram illustrating the bend angle $\theta_B$ and the bend diameter $D_B$ of a bend formed in the bend-insensitive optical fiber of FIG. 1.

FIG. 2B is a schematic diagram illustrating a bend angle $\theta_B$ and a bend diameter $D_B$ of an example bend-insensitive optical fiber in the form of nanostructure fiber 12 having a bend 55 formed therein. Bend diameter $D_B$ is twice the bend radius $R_B$. Two arrows AR1 and AR2 represent the relative orientations (directions) of optical fiber 12 on either side of bend 55. Bend angle $\theta_B$ is defined by the intersection of arrows AR1 and AR2, as shown in the right-hand side of FIG. 2B. Because sections of optical fiber do not always remain perfectly straight before and after a bend, the bend angle $\theta_B$ is not exact, but serves as a useful approximation that generally describes the degree to which nanostructure fiber 12 is bent.

In example embodiments discussed below, a bend angle $\theta_B$ described as being "equal to or about equal to 180°" is used to describe a bend wherein the fiber doubles back on itself Such examples are discussed below in connection with FIG. 8, which shows an idealized example of a bend 55A, 55B wherein $\theta_B$ is equal to or about 180°. In an example embodiment, the bend-insensitive optical fibers used in the present invention have a bend diameter $D_B$ as small as 10 mm.

Telecommunication System with Bi-directional Tap Assembly

Figure 3A:
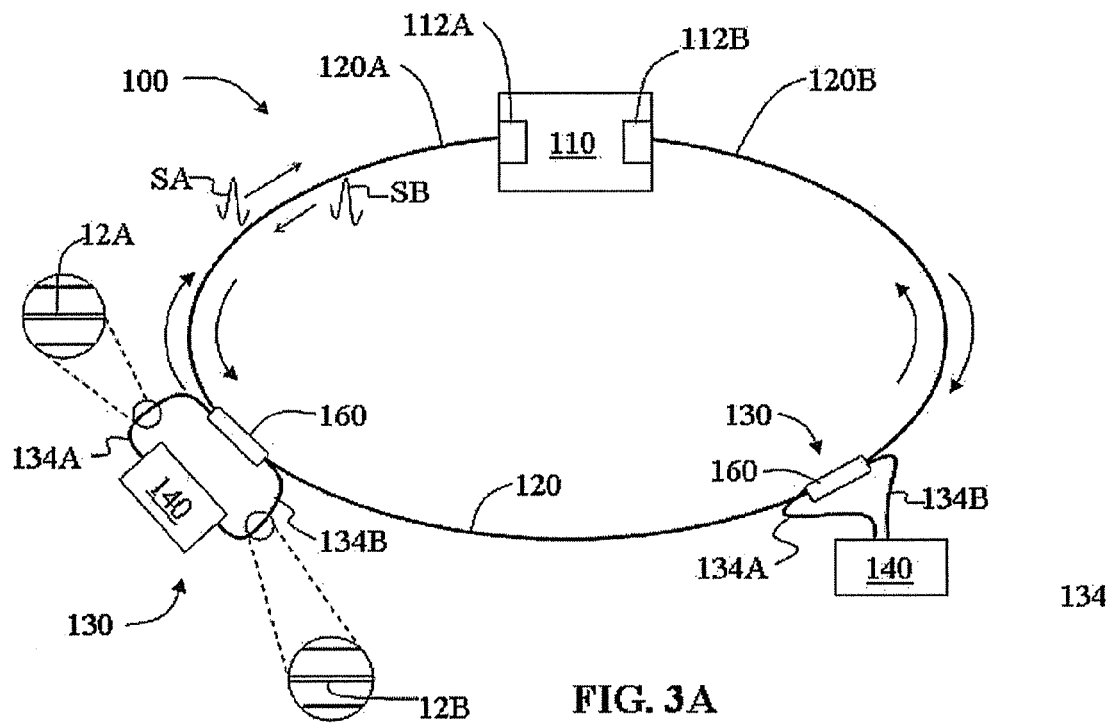
FIG. 3A is a schematic diagram of a bi-directional telecommunication system having a ring-topology and that includes a fiber-optic cable with two bi-directional tap assemblies arranged at respective mid-span access locations.

FIG. 3A is a schematic diagram of an example telecommunication system 100 having a central station 110 that includes two transmitting/receiving (T/R) units 112A and 112B. System 100 includes a fiber-optic cable 120 (e.g., a distribution cable) having first and second ends 120A and 120B respectively optically coupled to uplink and downlink T/R units 112A and 112B, thereby forming a ring topology. Fiber-optic cable 120 carries a number of optical fibers 124 (not shown in FIG. 3A; see FIG. 4A). These fibers are referred to herein as "cable fibers." Optical signals carried by cable fibers can travel from central station 110 in both directions as uplink and downlink signals SA and SB, as shown. Note that uplink signal SA travels toward uplink T/R unit 112A and downlink signal SB travels toward downlink T/R unit 112B.

Figure 3B:
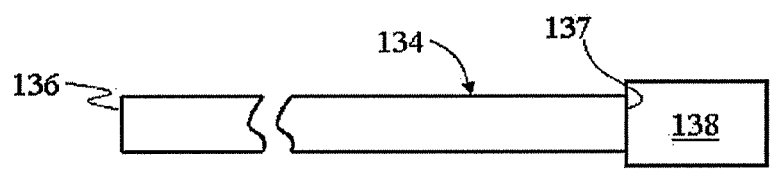
FIG. 3B is a close-up view of a connectorized embodiment of one of the tethers of FIG. 3A.

According to one aspect, cable 120 includes at least one bi-directional tap assembly 130. Various embodiments of bi-directional tap assembly 130 are discussed in greater detail below. Two bi-directional tap assemblies 130 at two different mid-span locations are shown in FIG. 3A for the sake of illustration. Each tap assembly 130 includes a protective cover 160 (discussed below), an upstream tether 134A that includes one or more upstream tether fiber sections ("tether fibers") 12A and a downstream tether 134B that includes one or more downstream tether fibers 12B. In an example embodiment, one or both of tethers 134A and 134B is/are preconnectorized. FIG. 3B is a close-up view of a connectorized upstream tether 134 that has a proximal end 136, a distal end 137, and a connector 138 at tether distal end 137. In alternate example embodiments discussed below, the tether fibers are formed from sections of cable fibers 124 carried by fiber-optic cable 120.

In an example embodiment, bi-directional telecommunication system 100 further includes at least one external device 140 optically coupled to at least one of tethers 134A and 134B. External device 140 may be, for example, a traffic-monitoring device that produces traffic monitoring data in the form of optical data signals provided to central station 110 via optical fiber tethers 134A and 134B and fiber-optic cable 120. External device 140 may also be adapted to receive command signals from central station 110, as well as signals from another external device 140. External device 140 may also be, for example, a single-port or multi-port connection terminal.

Figure 3C:
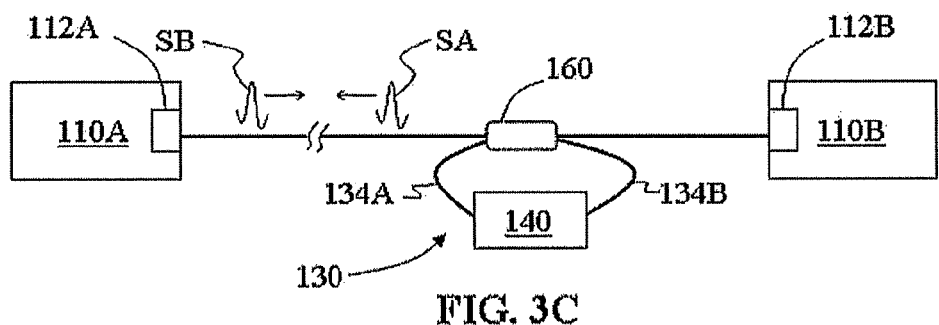
FIG. 3C is a schematic diagram of a linear bi-directional telecommunication system that includes a fiber-optic cable with a single bi-directional tap assembly arranged at a mid-span access location.

FIG. 3C is a schematic diagram of an example embodiment of another bi-directional telecommunication system 100 that utilizes a linear topology. System 100 of FIG. 3C includes two end-stations 110A and 110B that respectively include upstream and downstream T/R units 112A and 112B. The T/R units 112A and 112B are optically coupled by fiber-optic cable 120. A single bi-directional tap assembly 130 at one mid-span location is shown by way of illustration. Upstream and downstream T/R units 112A and 112B exchange uplink and downlink optical signals SA and SB, which can also be tapped and re-directed using bi-directional tap assembly 130, as described in greater detail below.

First Example Bi-directional Tap

Figure 4A:
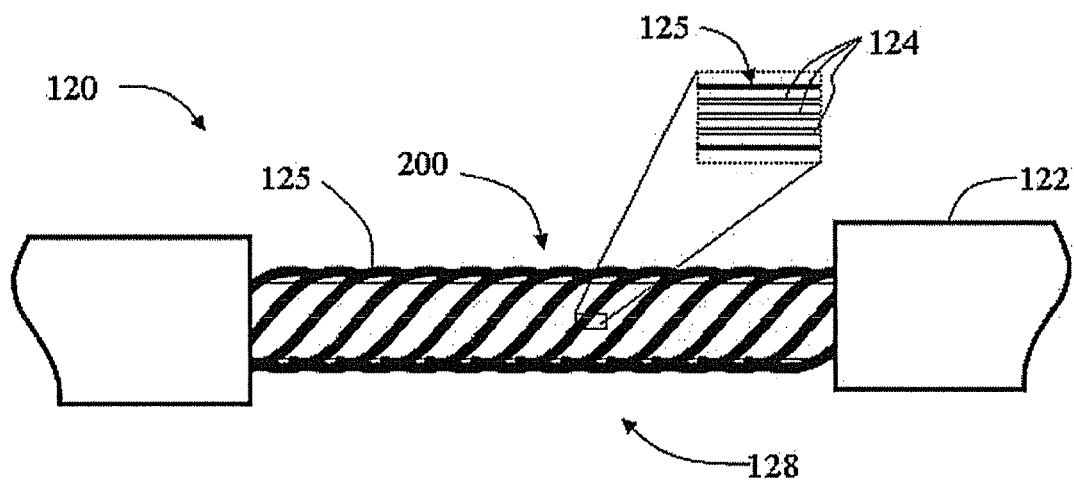
FIG. 4A is a schematic close-up side view of a stripped section of an example fiber-optic cable showing a twisted array of buffer tubes carried by the cable.

Now described is a method of forming a first example embodiment of bi-directional tap assembly 130 according to the present invention. FIG. 4A is a schematic close-up view of a mid-span section 200 of an example fiber-optic cable 120 having formed therein an exposed region 128 at a mid-span location. Fiber-optic cable 120 as shown is a loose-tube cable that includes an outer cover or sheath 122 and a number of cable fibers 124 contained in helically stranded buffer tubes 125, as shown in the inset. Each buffer tube 125 contains one or more cable fibers 124. Cable fibers can be, for example, cable fibers such as Corning SMF-28, available from Corning, Inc., Corning, N.Y.

Figure 4B:
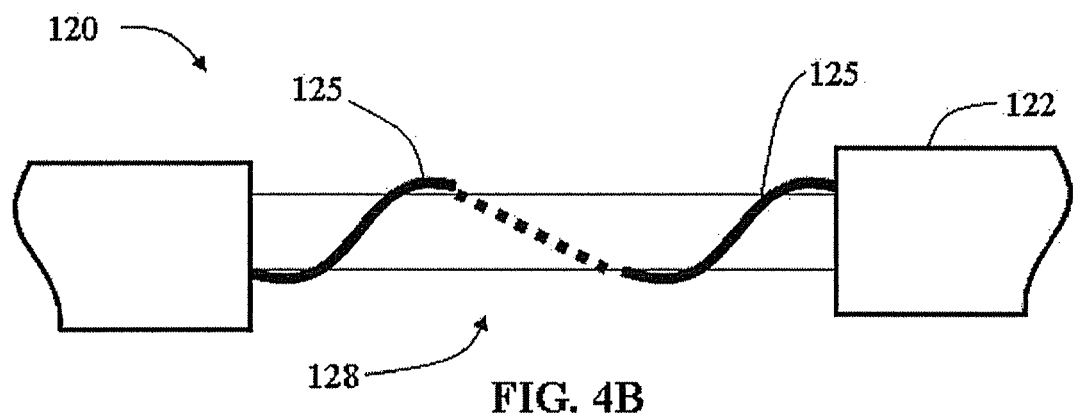
FIG. 4B is essentially the same as FIG. 4A but showing only one of the buffer tubes for the sake of illustration.
Figure 4C:
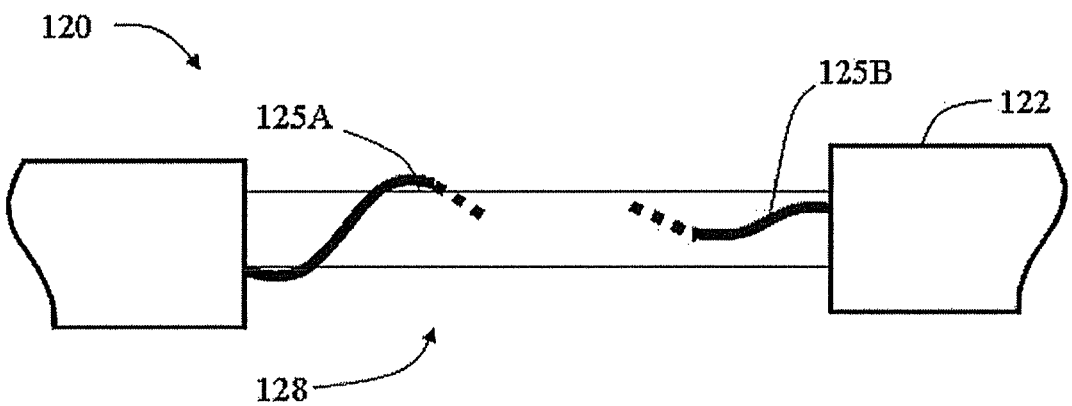
FIG. 4C is similar to FIG. 4B, but showing sections of two different buffer tubes.

FIG. 4B is essentially the same as FIG. 4A but shows only one buffer tube 125 for ease of illustration. FIG. 4C shows buffer tube sections 125A and 125B, wherein in one example embodiment the sections are from the same buffer tube while in another example embodiment the sections are associated with different buffer tubes. In the example embodiments below, cable fibers 124 can be taken either from the same buffer tube or from different buffer tubes, depending on the particular application.

Bi-directional tap 130 is formed by removing a portion of outer cover (sheath) 122 at one or more mid-span access locations to create corresponding one or more exposed regions 128, wherein buffer tubes 125 and cable fibers 124 therein can be accessed. In an example embodiment, at least one cable fiber 124 carries optical signals that travel in both the upstream and downstream directions.

Figure 5A:
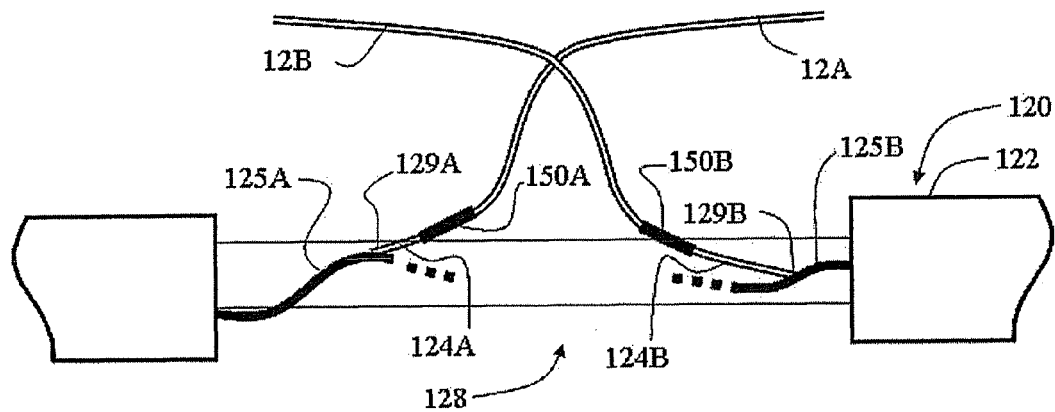
FIG. 5A is similar to FIG. 4C, but illustrating two tether fibers spliced to respective cable fiber ends.
Figure 5B:
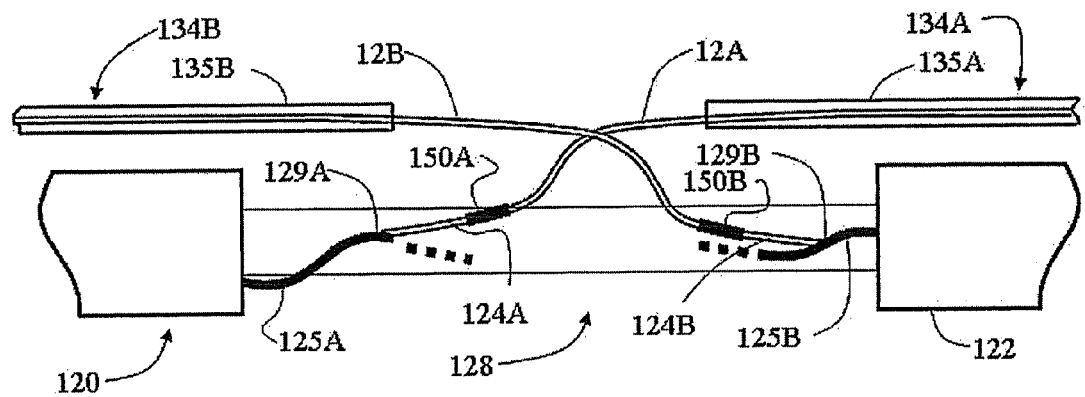
FIG. 5B is similar to FIG. 5A, and illustrates the tether fibers contained in respective tether covers to form respective tethers.
Figure 5C:
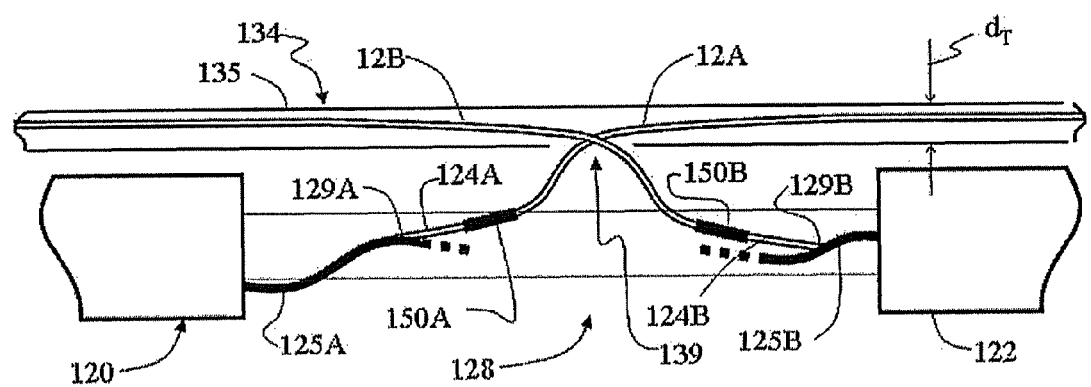
FIG. 5C is similar to FIG. 5B, and illustrates an example embodiment that includes a single tether cover that extends along the fiber-optic cable and that is used to contain the tether fibers and form two tethers.

FIGS. 5A-5C illustrate example embodiments of forming a bi-directional tap 130. To create bi-directional tap 130, a buffer tube 125 that carries cable fiber 124 is identified in exposed region 128 as described above and as shown in FIG. 4A through FIG. 4C. In an example embodiment where cable fibers 124 are taken from a single buffer tube, the particular buffer tube 125 is identified and then partially extracted from the bundle of buffer tubes carried by fiber-optic cable 120. Cable fiber sections 124A and 124B are then extracted from buffer tube 125 at one or more access points, such as respective access points 129A and 129B.

In an example embodiment, the process of extracting cable fiber sections 124A and 124B may involve, for example, making a mid-point cut in buffer tube 125 to cut fiber 124 therein so that it can be extracted from the access point. To create an access point on a cable containing at least one buffer tube, an appropriate buffer tube may be accessed in multiple places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes remain helically wrapped around a central member.

Extracted cable fiber sections 124A and 124B each now have a terminal end. While this selected cable optical fiber 124 is preterminated to form the cable fiber sections, the other uncut cable fibers 124 remain intact and continue through the distribution cable, possibly being preterminated at another access point. In some embodiments, a water-blocking wrap and/or a protective layer may be added around the access location prior to forming the protective cover, as described below.

In an example embodiment illustrated in FIG. 5A, the extracted cable fiber sections 124A and 124B are optically connected or optically coupled (e.g., spliced, such as fusion-spliced) at optical connections 150A and 150B (e.g., splices as shown) to respective tether fibers 12A and 12B. In an example embodiment illustrated in FIG. 5B, portions of tether fibers 12A and 12B are then enclosed in respective tether covers 135A and 135B to form respective tethers 134A and 134B that extend along fiber-optic cable 120 in opposite (e.g., upstream and downstream) directions. Tether fibers can be, for example, standard cable fibers such as Corning SMF-28, available from Corning, Inc., Corning, N.Y.

FIG. 5C is similar to FIG. 5B and illustrates an example embodiment that includes a single tether cover 135 that extends in both directions along fiber-optic cable 120 and that covers both tether fibers 12A and 12B. Tether cover 135 includes an opening 139 through which tether fibers 12A and 12B (or cable fibers 124A and 124B, as the case may be depending on the location of uplink and downlink splices 150A and 150B) are inserted. Tether cover has an inside diameter $d_T$.

Figure 5D:
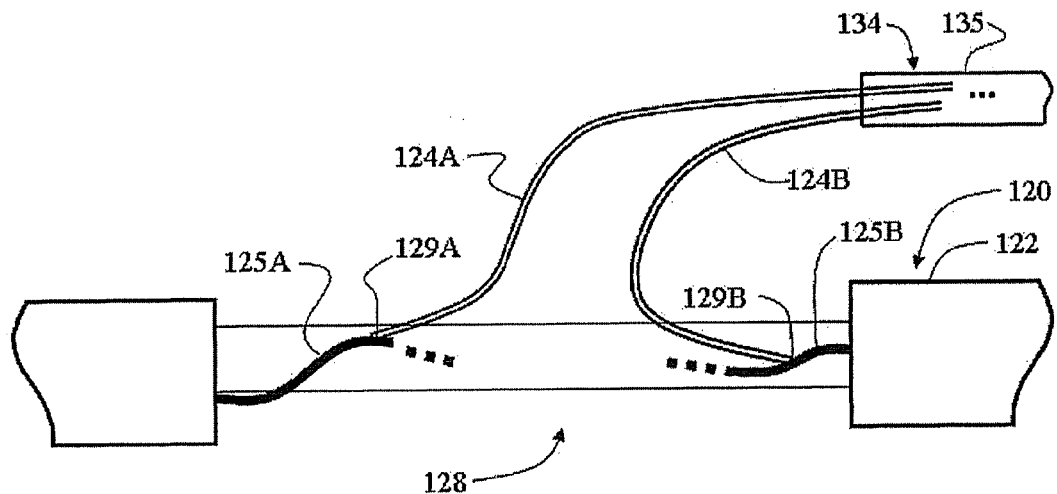
FIGS. 5D-5F are similar to FIGS. 5A-5C, but illustrate example embodiments wherein the cable fiber sections are used to form the tether.
Figure 5E:
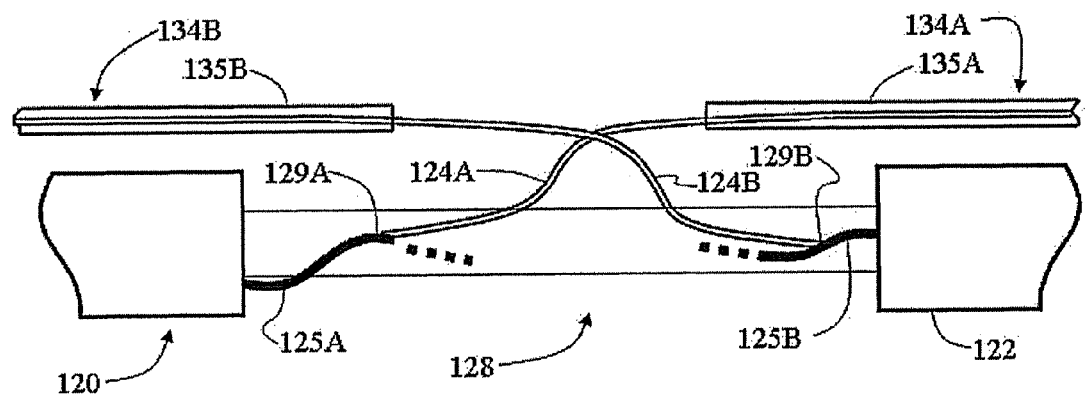
Figure 5F:
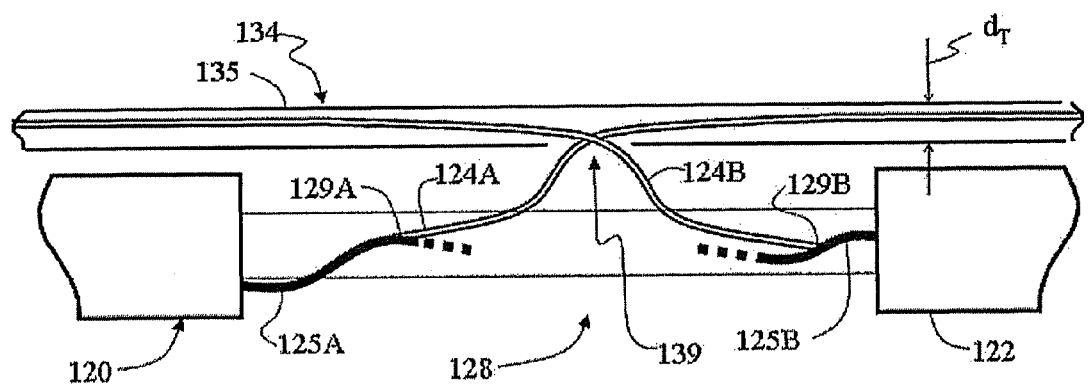
Figure 5G:
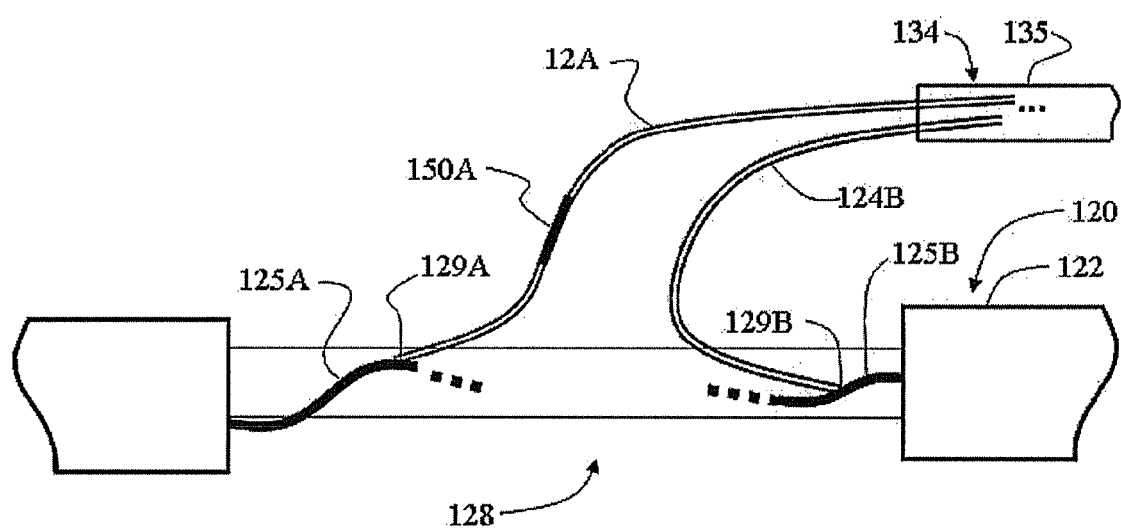
FIG. 5G is a schematic diagram similar to FIG. 5D, illustrating an example embodiment wherein the tether is formed from one cable fiber section and one tether fiber.

FIGS. 5D-5F are similar to FIGS. 5A-5C, but illustrate example embodiments wherein the cable fiber sections 124A and 124B constitute the tether fibers rather than using separate tether fibers. Example embodiment illustrated by FIG. 5D shows a tether comprised of two cable fibers and a common tether cover. Example embodiment illustrated by FIG. 5E shows two cable fibers exiting in separate directions and extending into separate tether covers. Example embodiment illustrated by FIG. 5F shows two cable fibers exiting in separate directions and extending into a common cover. In another example embodiment illustrated in FIG. 5G, one cable fiber section (e.g., section 124A), and one separate tether fiber 12B that is optically connected to cable fiber section 125B, are used to form tether 134. In other embodiments (not shown), ribbon fiber cables such as RPX™ can have one or more fibers accessed by conventional remote ribbon access tools. The fibers can be combined, within the tether, in any desired configuration to be connectorized at the tether distal end with at least one multifiber connector, though some instances of single fiber connectors on tethers from ribbon fiber cables are possible.

Figure 6A:
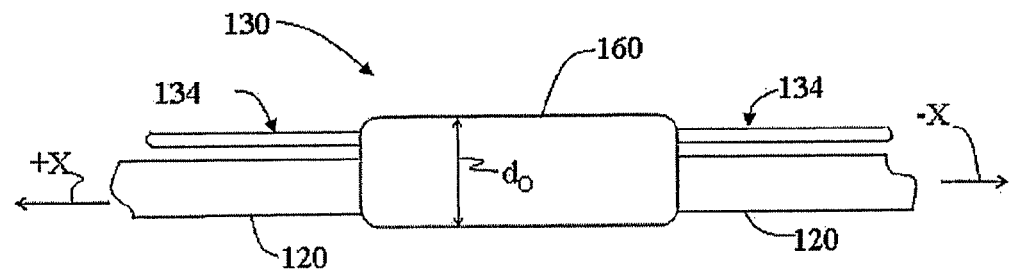
FIG. 6A is a schematic side view of the bi-directional tap assembly of FIG. 5B or FIG. 5C, wherein the assembly includes a low-profile protective cover, with the two tethers passing through respective sides of the protective cover to run along the fiber-optic cable in opposite directions.

FIG. 6A is a schematic side view of the bi-directional tap assembly 130 of FIG. 5B or FIG. 5C, wherein the tap is covered by a protective cover 160, such as an overmolded portion or a clam-shell-type housing. In an example embodiment, protective cover 160 is formed by an overmolding process that includes preparing the sheath of the distribution cable, such as by cleaning and roughening, flame preparing or chemically preparing the surface. The assembly is placed into an overmolding tool and a flowable overmolding material is introduced into a mold cavity defined by the molding tool. The final overmold preferably has a low profile, e.g., an outer diameter $d_o$ sufficiently small to allow the assembly to be installed in buried and aerial networks through any conduit or duct less than 5 inches in breadth, or over aerial installation sheave wheels and pulleys. Intrinsic properties of the overmold material contribute to its flexibility, and in some embodiments, the geometric shape of the overmold and the positioning of strength components and bend elements within contribute to controlled stiffness. In an exemplary embodiment, overmold diameter $d_o$ is sized so that bi-directional tap assembly 130 can fit through apertures of 1.25" in diameter.

Figure 6B:
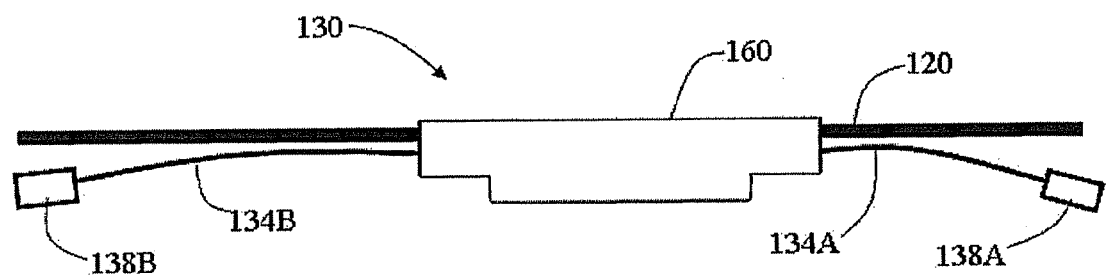
FIG. 6B is a schematic side view similar to FIG. 6A, showing connectorized tethers.

As discussed above, in an example embodiment, one or both of tethers 134A and 134B include a connectorized (e.g., pre-connectorized) distal end 137A and 137B having respective connectors 138 (i.e., 138A and 138B such as a single fiber connector, duplex connector or multi-fiber connector. Common multi-fiber connectors 138 include 4-fiber, 6-fiber, 8-fiber and 12-fiber connectors. In an example embodiment, connectors 138A and 138B are configured to connect tethers 134A and 134B to an external device 140. FIG. 6B is similar to FIG. 6A and illustrates another example embodiment wherein tethers 134A and 134B are connectorized.

Figure 6C:
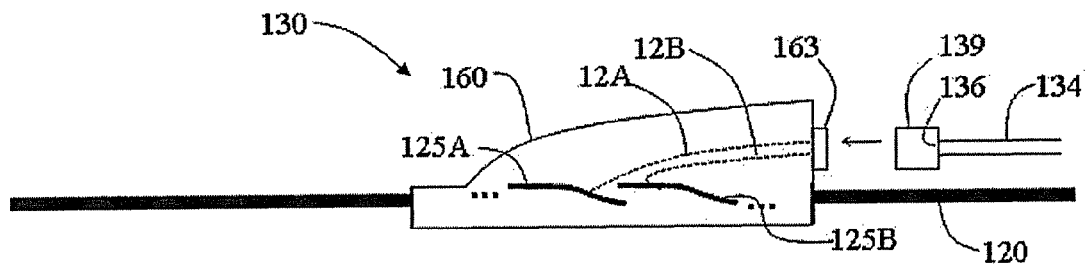
FIG. 6C is a schematic diagram similar to FIG. 6B and illustrates an example embodiment of the bi-directional tap assembly that includes an adapter for connecting to a connectorized tether.

FIG. 6C is a schematic diagram similar to FIG. 6B and illustrates an example embodiment of bi-directional tap assembly 130 wherein the assembly includes a protective cover 160 in the form of an overmolded shell. Protective cover 160 contains tether fibers 12A and 12B connected to respective cable fiber sections 124A and 124B (not shown; see, e.g., FIG. 5A). Tether fibers 12A and 12B are terminated with an adapter 163 that at least partially extends from protective cover 160. Tether 134 with a connector 139 at tether proximal end 136 can then be connected to the fiber-optic cable 120 via adapter 163.

Figure 6D:
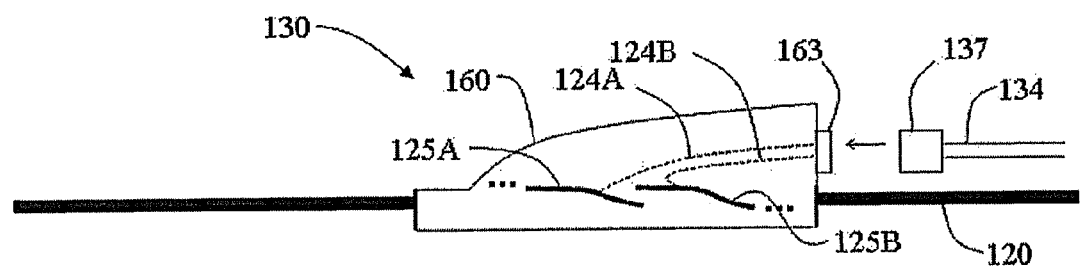
FIG. 6D is similar to FIG. 6C and illustrates an example embodiment wherein the cable fiber sections are connected directly to the adapter.

FIG. 6D is similar to FIG. 6C and illustrates an example embodiment wherein the fibers within protective cover 160 and connected to adapter 163 are cable fiber sections 124A and 124B (see also FIG. 5D). Example adapter configurations, similar to those illustrated in FIG. 6C and 6D, are described in U.S. patent application Ser. No. 11/888,220, published as U.S. 2008/0019641 and entitled "PRE-CONNECTORIZED FIBER OPTIC DISTRIBUTION CABLE HAVING OVERMOLDED ACCESS LOCATION," is hereby incorporated by reference.

An example method for connecting tethers 134A and 134B and the tether fibers 12A and 12B therein to fiber-optic cable 120 and respective cable fiber sections 124A and 124B therein involves exposing the appropriate buffer tube 125A and 125B and forming therein the aforementioned upstream and downstream access points 129A and 129B about 12" apart. Individual cable fiber sections 124A and 124B are then cut at the second buffer tube opening 129B and pulled out of the buffer tube at the first tube opening 129A. The downstream and upstream cable fiber sections 124A and 124B are then optically connected (e.g., spliced) to the respective upstream and downstream tether fibers 12A and 12B.

In another example embodiment of accessing a select cable fiber 124 in buffer tube 125, a length of fiber-optic cable 120 is exposed to create an exposed region 128 large enough to allow for three openings to be made in the buffer tube: upstream and downstream openings or access points 129A and 129B, and a mid-point opening or access point (not shown) between the upstream and downstream access points. These openings can be, for example, about 10" apart, in which case an additional 10" of cable needs to be opened as compared to using just two access points 129A and 129B. The mid-point opening point is used to cut the fiber, and the upstream and downstream openings 129A and 129B are used to pull the upstream and downstream cable fiber sections 124A and 124B out of the buffer tube 125 in both directions. In example embodiments where tether fibers 12A and 12B of tethers 134A and 134B are initially oriented in the same direction as their cable fiber counterparts 124A and 124B, protective cover 160 can be relatively compact and have a relatively low profile with respect to fiber-optic cable 120. This is important in fiber-optic cable deployment in situations where fiber-optic cable and bi-directional taps 130 need to be fed through small openings or stored on take-up reels, as discussed above.

In example embodiment of bi-directional tap assembly 130, cable fibers 124 and/or tether fibers 12 are ribbonized to form one or more ribbonized tethers 134A and/or 134B.

Second Example Bi-directional Tap

Figure 7A:
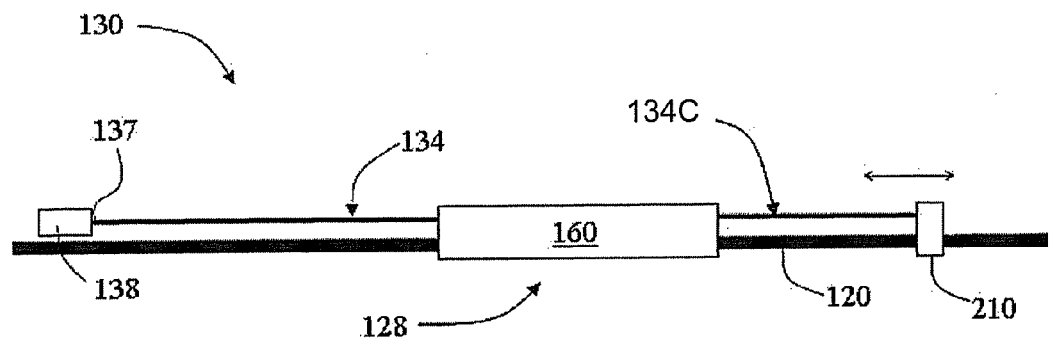
FIG. 7A is a schematic side view of another example embodiment of a bi-directional tap that includes a single tether that is translatable along the length of the fiber-optic cable.

FIG. 7A is a schematic side view of another example embodiment of a bi-directional tap 130 that includes a single tether 134 along a length of the fiber-optic cable 120 and that includes both "upstream" and "downstream" tether fibers, as discussed below. Bi-directional tap 130 of FIG. 7A includes protective cover 160 that covers the tether-fiber to cable-fiber splices at tap point 128 as also discussed in greater detail below. In an example embodiment, tether 134C runs through cover 160, with one end connected to a translatable mount 210 that is slideably mounted to fiber-optic cable 120. In an example embodiment, tether 134 is connectorized as tether end 137 with a connector 138.

Figure 7B:
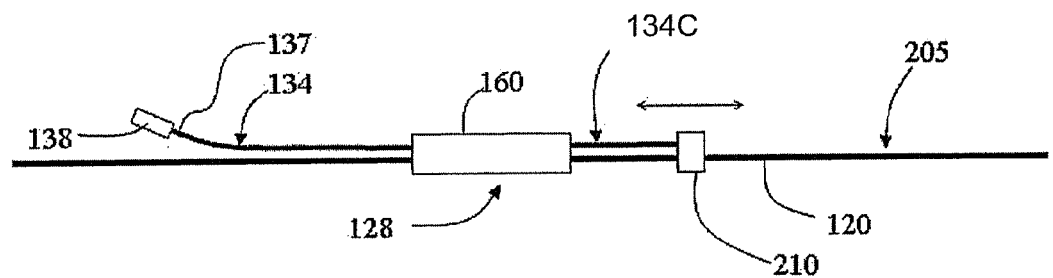
FIG. 7B is similar to FIG. 7A, and shows a fiber cut location where the select cable fibers can be accessed and cut using a fiber access tool.

FIG. 7B is similar to FIG. 7A, and shows a fiber cut location 205 where the select cable fibers 124 can be accessed and cut using a fiber access tool so that the cable fiber sections can be spliced at mid-span access point 128.

Figure 8:
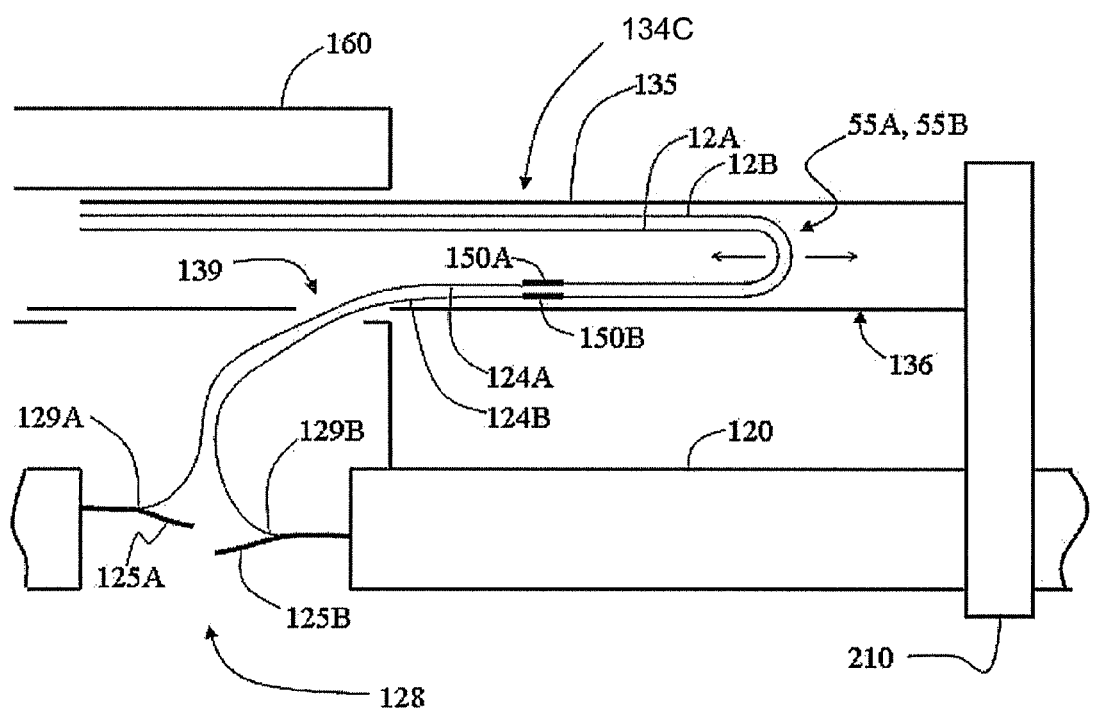
FIG. 8 is a close-up partial cut-away view of the bi-directional tap assembly 130 of FIGS. 7A-7B, showing the 180° bend in the two tether fibers.

FIG. 8 is a close-up partial cut-away view of the bi-directional tap assembly 130 of FIGS. 7A-7C. Tether fibers 12A and 12B are contained in tether cover 135, which in an example embodiment is in the form of a tube. In a preferred embodiment, tether fibers 12A and 12B are bend-performance fibers such as those discussed in detail above, meaning that they can each have respective tight bends 55A and 55B (e.g., as small as a 5 mm bend radius or a bend diameter $D_B$ of 10 mm) without significant loss in transmission performance. This allows the inside diameter $d_T$ of tether cover 135 to be relatively small, e.g., on the order of the size of the bend diameter $D_B$. In an example embodiment, the tether cover inside diameter $d_T$ defines the bend diameter $D_B$.

Tether fibers 12A and 12B initially lead away from tap point 128 in one direction and include respective bends 55A and 55B having a bend angle $\theta_B$ equal to or about 180° so that the tether fibers bend back on themselves and travel within tether cover 135 in the opposite direction back toward the tap point. When tether 134 is moved back and forth along fiber-optic cable 120, bends 55A and 55B also move back and forth within tether cover 135, allowing the tether fibers 12A and 12B to coil and re-coil as the tether is so moved.

Figure 9:
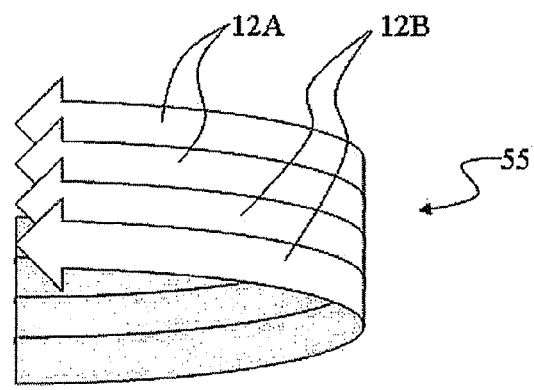
FIG. 9 is a close-up schematic perspective view of the tether fibers in the form of ribbon fibers having a common bend.

FIG. 9 is a close-up schematic perspective view of tether fibers 12A and 12B illustrating an example embodiment wherein the tether fibers are in the form of ribbon fibers having a common bend 55. In this example embodiment, fiber-optic cable 120 is a ribbon-type cable, such as Corning SST® ribbon cable available from Corning, Inc., Corning, N.Y.

Method of Forming Bi-directional Tap Assembly

An example method of forming the bi-directional tap assembly 130 of FIGS. 7A-7C and FIG. 8 is as follows. With reference to FIG. 8, the first step includes preparing tether 134 such that there is an extra length for all of the tether fibers 12 to be connected to their respective cable fiber sections 124. This extra length may be, for example, approximately 3". The next step includes forming the needed number of cable fiber sections 124 (e.g., 124A and 124B) from one or more buffer tubes 125, as described above.

In the case where separate tether fibers are used (instead of using cable fiber sections 124A and 124B as tether fibers), the next step includes identifying one or more tether fibers 12 to be connected to the corresponding one or more cable fiber sections 124. The next step includes optically connecting (e.g., splicing) the one or more cable fiber sections 124 (e.g., 124A and 124B) to the one or more tether fibers 12 (e.g., 12A and 12B) thereby forming corresponding optical connections 150 (e.g., splices 150A and 150B).

The next step includes looping each spliced cable-fiber/tether-fiber pair so that optical connections 150 reside between the respective loops (e.g., bends 55A and 55B) and downstream access points 129 (e.g., 129A and 129B). Bends 55 are formed in the bend-resistant tether fibers 12 rather than in the corresponding cable fibers 124. The next step includes pushing the one or more spliced cable-fiber/tether-fiber pairs into the tether cover 135 via opening 139 so that bends 55 remain formed in tether fibers 12. This maintains a fiber bend diameter $D_B=d_T$ in tether fibers 12 and also maintains the fiber bend angle $\theta_B$ to be equal to or about 180°. As bi-directional tap assembly 130 is wound on a reel or pulled through a sheave, tether cover 134 is protected from the effects of offset bend radii by translatable mount 210, which is translated along fiber-optic cable 120; bends 55 in tether fibers 12 travel along the length of the fiber-optic cable as well, as described above.

If the total number of cable fibers 124 being accessed is six or less (meaning total of 12 or less fibers passing through the tether), they can be connected into a single MT style multifiber connecter 138. If more than six fibers are being accessed, then the cable fibers from each direction of the cable can be put into their own tether (two tethers from one tap point, each with its own connector terminal).

According to one aspect of the present embodiments, in a multifiber cable, whether a ribbon fiber cable or a loose tube cable, one tap point might access a first subset of optical fibers (e.g., fibers 1-4) from the upstream direction, and a second subset of optical fibers (e.g. fibers 5-8) from the downstream direction. A third subset of optical fibers (e.g. fibers 9-12) would be express fibers. Downstream, the optical fibers of the first subset are dark, but each fiber can be accessed in a subsequent tap point from the downstream direction. Conversely, the fibers of the second subset can be accessed upstream of the original tap point, creating a tether location and utilizing, from both directions, full use of both the first and second fiber subsets, with direct or indirect communication with the central office by virtue of the bi-directionality of the system.

Protective Cover

In an example embodiment, the above-described protective cover 160 is or includes an overmold. The overmold is preferably flexible so that when it is combined with a flexible fiber-optic cable, it provides a flexible tap assembly that is durable yet sufficiently flexible so as to permit installation using known installation methods and equipment. In contrast to rigid enclosures, a flexible overmold is bendable and twistable and may be installed around installation pulleys and within a small diameter conduit while maintaining structural integrity, sealing, and optical and mechanical performance.

An exemplary overmolding process includes: (i) arranging portions of the tap assembly about a network access point in, for example, a cavity made by a molding tool, die or die-casting; (ii) introducing a curable material in fluid form into the cavity, the fluid essentially flooding the cavity, penetrating interstices around and about the assembly, and essentially covering the assembly; and (iii) curing the curable material within suitable curing conditions. Exemplary molding processes include, but are not limited to, pour and injection molding, pressure molding, and die casting. Alternative exemplary processes may include vacuum and heat forming processes.

Also, the overmold can be applied by extruding a flexible closure material while pulling the assembly through a die. The overmold is preferably a monolithic form. Beneath the overmold material may be disposed a flexible cover material, for example a paper, plastic, tape or wrapping material, to cover at least a portion of the assembly prior to applying the molding material so that the material will not directly contact components. In other embodiments, the molding material may directly contact the underlying components. In an example embodiment, an integral mesh (not shown) is used in combination with the overmold to prevent cracking of the overmold.

Exemplary overmold materials may include polyurethanes, silicones, thermoplastics, thermosets, elastomers, UV curable materials and like materials taken alone or in combination. The overmold may further include additives, plasticizers, flame retardant additives, dyes and colorants. Overmold flexibility and crush-resistance may be enhanced or relaxed based upon application. The term "curable" may include thermoplastic hardening, chemical additive curing, catalyst curing including energy curing as by heat or light energy, and phase changes. The overmold can also be formed using heat-shrink tubing.

In the example embodiments described above, the overmold can be bent with a force about equal to the force required to bend the fiber-optic cable itself (the cable to which the overmold is attached) without the overmold attached.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A bi-directional tap assembly, comprising:
   a fiber-optic cable that includes at least one cable optical fiber adapted to carry bi-directional optical signals and that is preterminated at a mid-span location to form a first cable fiber section having a first cable fiber end and a second cable fiber section having a second cable fiber end; and
   at least one tether fiber optically coupled to at least one of the first and second cable fiber ends, wherein
   the at least one tether fiber comprises at least one bend-insensitive fiber, and
   wherein the at least one bend-insensitive fiber includes at least one 180 degree loop.

2. The bi-directional tap assembly of claim 1, wherein the mid-span location includes an overmold having an outer diameter sized to fit through an opening of less than 5 inches.

3. The bi-directional tap assembly of claim 1, further comprising a protective cover that covers the mid-span location and respective end portions of first and second tethers optically coupled to the first and second cable fiber ends, respectively.

4. The bi-directional tap assembly of claim 3, wherein the protective cover includes an overmold.

5. The bi-directional tap assembly of claim 1, wherein the 180 degree loop is housed within a tether connected to the cable by a translatable body.

6. A bi-directional tap assembly, comprising:
   a fiber-optic cable that includes at least one cable optical fiber adapted to carry bi-directional optical signals and that is preterminated at a mid-span location to form a first cable fiber section having a first cable fiber end and a second cable fiber section having a second cable fiber end;
   at least one tether fiber optically coupled to at least one of the first and second cable fiber ends; and
   a tether that includes the at least one tether fiber, and wherein the tether is translatable along the fiber-optic cable,
   wherein the tether has a tether cover with a proximate end connected to a translatable mount that is slideably mounted to the fiber-optic cable.

7. A bi-directional tap assembly, comprising:
   a fiber-optic cable that includes at least one cable optical fiber adapted to carry bi-directional optical signals and that is preterminated at a mid-span location to form a first cable fiber section having a first cable fiber end and a second cable fiber section having a second cable fiber end;
   at least one tether fiber optically coupled to at least one of the first and second cable fiber ends;
   a tether that includes the at least one tether fiber; and
   a protective cover that covers the mid-span location and a portion of the tether, wherein the protective cover is adapted to allow the tether to move.

8. The bi-directional tap assembly of claim 7, wherein the least one tether fiber is connectorized.

9. The bi-directional tap assembly of claim 7, wherein the at least one tether fiber comprises a ribbonized optical fiber.

10. The bi-directional tap assembly of claim 7, wherein the at least one tether fiber comprises at least one bend-tolerant fiber.

11. The bi-directional tap assembly of claim 7, wherein the at least one tether fiber is operably connected to an external device.

12. A method of forming a bi-directional tap in a fiber-optic cable that includes at least one cable optical fiber, comprising:
   a) at a mid-span location, preterminating the at least one cable optical fiber to form corresponding at least one first and at least one second cable fiber sections having respective first and second cable fiber ends;
   b) optically coupling the at least one first and the at least one second cable fiber sections at their respective first and second cable fiber ends to respective at least one first and at least one second tether fibers;
   c) containing the at least one first tether fiber in a first tether fiber cover that travels along the fiber-optic cable in a first direction; and
   d) containing the at least one second tether fiber in a second tether fiber cover that travels along the fiber-optic cable in a second direction along the fiber optical cable opposite the first direction.

13. The method of claim 12, further comprising forming an overmold over the mid-span location and an end-portion of the tether.

14. The method of claim 12, further comprising forming an outer covering comprising a mesh and an overmold.

15. A method of forming a bi-directional tap in a fiber-optic cable that includes at least one cable optical fiber, comprising:
   a) at a mid-span location, preterminating the at least one cable optical fiber to form corresponding at least one first and at least one second cable fiber sections having respective first and second cable fiber ends;
   b) optically coupling the at least one first and the at least one second cable fiber sections at their respective first and second cable fiber ends to respective at least one first and at least one second tether fibers;
   c) forming the at least one first and at least one second tether fibers from bend-tolerant fibers;
   d) forming a bend equal to or substantially equal to 180 degrees in each of the bend-tolerant fibers; and
   e) containing in a tether cover having a first end, a portion of the bend-tolerant fibers that includes the bends so that the bend-tolerant fibers terminate at the tether cover first end.

16. The method of claim 15, wherein the bend-tolerant fibers are bend-insensitive.

17. A method of forming a bi-directional tap in a fiber-optic cable that includes at least one cable optical fiber, comprising:
   a) at a mid-span location, preterminating the at least one cable optical fiber to form corresponding at least one first and at least one second cable fiber sections having respective first and second cable fiber ends;

b) optically coupling the at least one first and the at least one second cable fiber sections at their respective first and second cable fiber ends to respective at least one first and at least one second bend-insensitive tether fibers; and c) forming a bend equal to or substantially equal to 180 degrees in each of the bend-insensitive fibers; and d) terminating the bend-insensitive fibers with a fiber optic connector.

18. The method of claim 17, further comprising attaching the fiber-optic connector to an external device.

* * * * *